Figure 1:
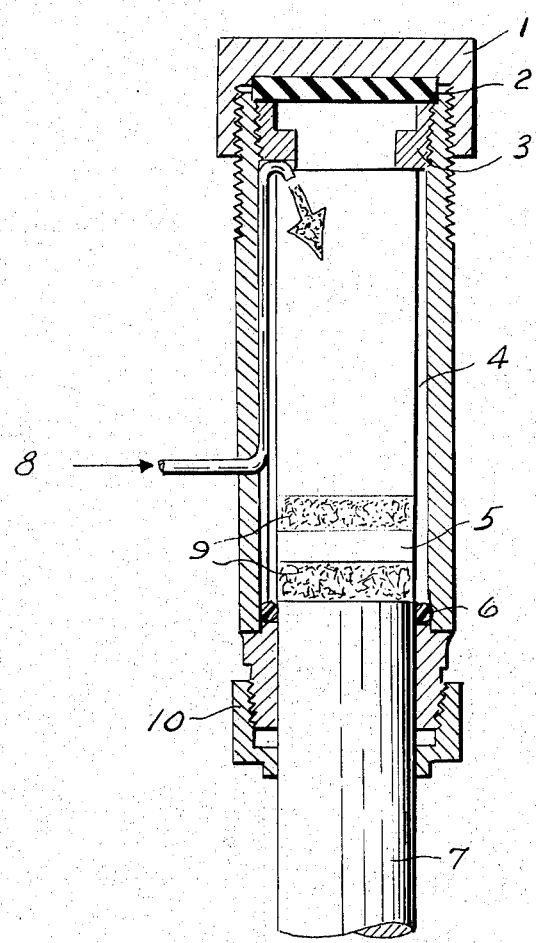

United States Patent [19]
Fore et al.

[11] 3,779,066
[45] Dec. 18, 1973

[54] DETERMINATION OF RESIDUAL SOLVENT IN OILSEED MEALS AND FLOURS BY A VOLATILIZATION PROCEDURE

[75] Inventors: Sara P. Fore; Eric T. Rayner; Harold P. Dupuy, all of New Orleans, La.

[73] Assignee: The United States of America as represented by the Secretary of Agriculture, Washington, D.C.

[22] Filed: Mar. 28, 1972

[21] Appl. No.: 238,878

Related U.S. Application Data
[63] Continuation-in-part of Ser. No. 109,883, Jan. 26, 1971, Pat. No. 3,715,910.

[52] U.S. Cl. ............................................... 75/23.1
[51] Int. Cl. ............................................ G01n 31/08
[58] Field of Search ................................ 73/23.1

[56] References Cited
UNITED STATES PATENTS
3,225,520  12/1965  Burow ............................ 73/23.1 X

OTHER PUBLICATIONS
Nelsen et al. Analytical Chemistry, Vol. 33, No. 9, August 1961, pp. 1,150–1,151
Breally et al., Analyst, Vol. 84. April 1959, pp. 221–225
Nawar et al., Analytical Chemistry, Vol. 32, No. 11, Oct. 1960, p. 1,534
Supina et al., Chemistry, Vol. 37, No. 11, Nov. 1964, pp. 12–17

*Primary Examiner*—Charles A. Ruehl
*Attorney*—R. Hoffman et al.

[57] ABSTRACT

This invention relates to a simple, rapid and direct gas-chromatographic (GC) procedure for detecting residual solvents and other volatiles present in vegetable oils, peanuts, nut-butter products, and oilseed meals and flours. A sample of the product to be analyzed is placed between glass wool plugs in a glass insert tube of a gas chromatograph. When required, water is added in a prescribed manner to facilitate the release of the volatile materials present. The insert tube is placed in the heated inlet of the gas chromatograph and the volatiles are then analyzed directly by temperature programmed gas chromatography.

1 Claim, 2 Drawing Figures

DETERMINATION OF RESIDUAL SOLVENT IN OILSEED MEALS AND FLOURS BY A VOLATILIZATION PROCEDURE

This is a continuation-in-part of Ser. No. 109,883 filed Jan. 26, 1971, now Pat. No. 3,715,910.

A non-exclusive, irrevocable, royalty-free license in the invention herein described, throughout the world for all purposes of the United States Government, with the power to grant sublicenses for such purposes, is hereby granted to the Government of the United States of America.

In recent years, the use of solvents in processing various agricultural commodities has become increasingly important. Hexane is used for the extraction of oil from oilseed meals. Isopropyl alcohol and acetone have been shown to be effective in removing aflatoxins from contaminated cottonseed or peanut meals [Rayner, E. T. and Dollear, F. G., Journal of the American Oil Chemists' Society 45, 662–624 (1968)]. When such commodities, however, are contacted with solvent during processing it becomes necessary to accurately determine the levels of residual solvent which remain in the finished product. A number of procedures have been developed for the determination of residual solvent in oilseed meals and flours, but none of them are rapid or sensitive enough to monitor modern continuous desolventization processes. The flash-cup method [Gastrock, E. A., Spadaro, J. J, Crovetto, A. J., and Brian, R., Journal of the American Oil Chemists' Society 37, 192–195 (1960)] is time consuming and not effective below a concentration of 300 ppm of residual hexane. The azeotropic distillation procedure is very sensitive, but it involves much work and the use of a correction factor which has a tendency to vary with different types of samples [Todd, P. H., Jr., Food Technology (Chicago) 14, 301–305 (1960) and (Dupuy, H. P., Fore, S. P., Journal of the Amercian Oil Chemists Society, 47, 231–233 (1970)]. The volatilization procedure described in our patent application (Ser. No. 109,883, filed Jan. 26, 1971) is very simple and sensitive, but it requires up to 5 hours for example, to volatilize acetone from a sample of oilseed meal or flour prior to gas-chromatographic analysis of the headspace gas. Although the volatilization procedure is preferred for routine analysis, it is not suitable when rapid analysis is necessary. This invention constitutes a simple, rapid and sensitive method for determining residual solvents and other volatiles in a variety of agricultural products.

In general, according to the invention, a process for quantitatively determining residual solvents and acetone dimers in meals and flours is provided. The process involves inserting one part of a sample of meal or flour between two plugs of glass wool in a glass liner, adding one to five parts of water to the sample, inserting the liner with the sample into the heated injection port of a gas chromatograph to force the carrier gas through the sample, accelerating the elution of the solvent, and thereafter analyzing the eluted solvent by temperature programmed gas chromatography.

Figure 2:
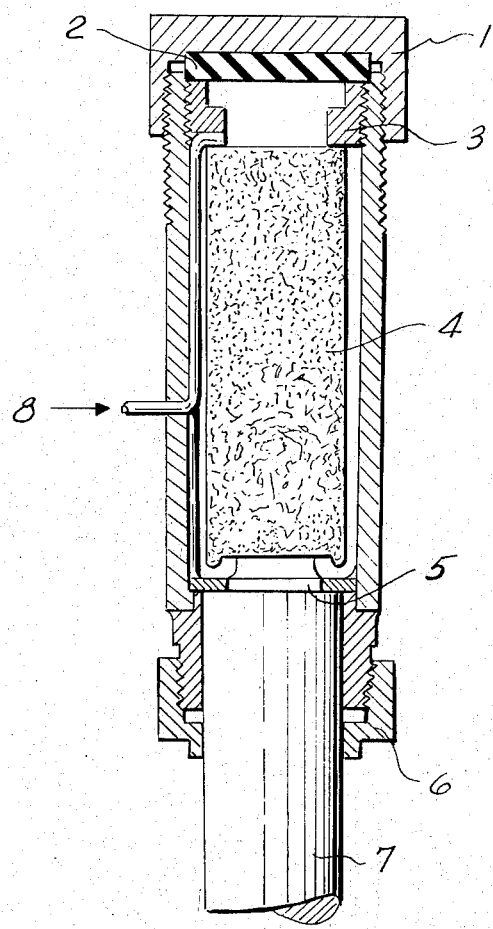

In the accompanying drawing,

FIG. 1 shows a cross-section of a gas chromatograph inlet liner containing a sample of meal or flour between glass wool plugs, and FIG. 2 shows a cross-section of a gas chromatograph inlet liner containing a sample of deodorized vegetable oil dispersed on glass wool.

Referring to FIG. 1, the device depicted is used as follows

The septum nut 1, septum 2 and retainer nut 3 are removed in that order. A silicone 0 ring 6 is then positioned at the base of the inlet and the inlet liner 4 with sample 5 is inserted in the inlet and secured in position with the retainer nut 3. As pressure is applied on the upper lip of the inlet liner with the retainer nut 3, the silicone 0 ring 6 creates a seal between the lower lip of the liner and the base of the inlet. The inlet is closed by placing the septum 2 in position and tightening the septum nut 1. As the inlet is closed, the carrier gas 8 is forced to flow upward and through the sample 5 and the volatiles are swept onto the GC column 7 which is secured in position with the inlet column fitting 10. The glass wool 9 prevents the sample 5 from coming in contact with the GC column 7 allows the volatiles in the sample to be swept onto the column 7. The volatiles are then resolved by temperature programming the column oven.

Referring to FIG. 2, the device depicted thereby is employed as follows.

The septum nut 1, septum 2, and retainer nut 3 are removed in that order. A silicone 0 ring 5 is then positioned at the base of the inlet and the inlet liner with sample of oil on glass wool 4 is inserted in the inlet and secured in position with the retainer nut 3. As pressure is applied on the upper lip of the inlet liner with the retainer nut 3, the silicone 0 ring 5 creates a seal between the lower lip of the liner and the base of the inlet. The inlet is closed by placing the septum 2 in position and tightening the septum nut 1. As the inlet is closed, the carrier gas 8 is forced to flow upward and through the sample 4 and the volatiles are swept from the oil onto the GC column 7 which is secured in position with inlet column fitting 6. The glass wool 4 allows the oil sample to diffuse on it and the volatiles in the oil to be swept onto the GC column 7 but it prevents the oil from seeping onto the column 7. The voltatiles are then resolved by temperature programming the column oven.

The specific method for determining residual solvents or voltatiles by this rapid elution procedure varies both with the type of product to be analyzed and the type of volatiles to be detected. In the preferred process of this invention, the following procedures are applied.

Vegetable Oils

The sample of vegetable oil to be analyzed is placed directly on a glass wool plug contained in an inlet liner of a gas chromatograph. The oil diffuses throughout the glass wool providing good surface area exposure. A sufficient amount of glass wool is used to prevent liquid seepage through the liner which would contaminate the column. An additional amount of glass wool is placed over the oil sample and the liner is inserted in the heated injection port of a gas chromatograph and analyzed by programmed gas chromatography using a Porapak P (80–100 mesh highly crosslinked polystyrene bead manufactured by the Waters Associates for use in gas chromatograph packing material) column. Residual solvent concentrations are determined by use of a calibration curve devised for this purpose.

This procedure is sufficiently sensitive that it may also be applied to salad or cooking oils for the special purpose of detecting trace amounts as volatile materials associated with off-flavors or rancidity. By a measure of the concentration and type of volatile components present in the oil, it is possible to determine objectively the degree of oxidative deterioration which has occurred in that oil. As might be anticipated, a recently prepared, freshly deodorized oil will show the presence of few volatile components, whereas an oil subjected to long term or adverse storage will show the presence of increased number and concentration of volatile components. This rapid elution procedure enables the trained analyst to reliably access vegetable oil quality in less than an hour since no prior concentration of voltatiles is required.

Nut-Butter Products

A sample of the product to be analyzed (as peanut butter) is placed into a serum bottle containing glass beads and some water. This operation is carried out in an atmosphere of nitrogen gas to preclude the generation of spurious oxidation products in the water-diluted sample. The bottle is sealed and weighed. From a pre-weight of all the components of the serum bottle, the exact weight of sample added can be calculated. By means of an injection syringe, distilled water then is added through the septum of the sealed bottle to adjust the water-to-sample ratio to 1.5 to 1. The serum bottle is then shaken to provide a smooth liquid slurry. The rapid elution analysis is carried out by injecting a measured quantity of the liquid slurry directly on to a plug of glass wool contained in an inlet liner of a gas chromatograph. The liner is allowed to remain in the heated injection port of the gas chromatograph and heated at a constant temperature for a specified period of time. During this period the sample volatiles are swept on to the chromatographic column by the carrier gas. The liner is then removed from the gas chromatograph and the inlet port is quickly resealed. The volatile materials now absorbed on the gas chromatographic column are readily resolved by temperature programming.

Oilseed Meals and Flours

A sample of the oilseed meal or flour is placed on a plug of glass wool contained in an inlet liner of a gas chromatograph.

For hexane determinations, the sample is covered with another glass wool plug and the liner is inserted in the heated injection port. Then a quantity of water is injected on this glass wool cover directly above the meal to provide a wetting of the meal sample. For acetone or isopropyl alcohol determinations the sample is covered with a glass wool plug, and a quantity of water is added directly onto the glass wool cover. The prepared liner then is inserted into the heated injection port of the GLC and analyzed by programmed gas chromatography using a Porapak P column for hexane and a Porapk Q column for acetone or isopropyl alcohol determinations. The concentrations of residual solvent present in the oilseed meal or flour is easily determined by use of a suitable calibration curved devised for this purpose.

For mesityl oxide or diacetone alchohol determinations, instead of water, a quantity of water-saturated synthetic zeolites (alkali metal aluminosilicates known in the trade as molecular sieves) is placed on a small plug of glass wool directly over the sample. On heating in the programmed gas chromatographic procedure which follows, the molecular sieves release water in a prolonged fashion to facilitate the volatilization of the mesityl oxide or diacetone alcohol present. The concentration of residual solvent present in the oilseed meal or flour is determined by use of a suitable calibration curved devised for this purpose.

In addition to residual solvent determinations, this rapid elution procedure may be used to assess the odor and flavor characteristics of other materials such as roasted peanuts, coffee and the like having volatile components. For such applications, the product to be analyzed is ground in a mortar when desired and a small quantity placed between glass wool plugs contained in an inlet liner of a gas chromatograph. The procedure is carried out in the same manner as for oilseed meals and flours. The pattern of volatile components eluted from acceptable and unacceptable samples provide the basis for comparison of unknown samples. In this manner the quality of a given product can be determined objectively in a very short period of time since no prior concentration of volatiles is required.

The following examples illustrate but do not limit the scope of this invention.

Example 1

Analysis of Vegetable Oils for Residual Hexane

A medium-size plug of volatile-free glass wool is inserted at the bottom of the glass liner of the injection port of a gas chromatograph. A 25-milligram sample of deodorized, refined or crude oil is placed on top of the glass wool and covered with an additional amount of glass wool. The liner is inserted in the heated injection port and tightened in position with the inlet retainer nut. The injection port is sealed immediately with the septum and septum nut. The digital intergrator and the temperature programmer are turned on. The flow of the carrier gas through the sample and heat from the injection port results in rapid elution of the residual hexane which is swept onto the column of the gas chromatograph without contaminating the column with oil. After the chromatographic run is complete, the spent sample is removed from the inlet. The column is then cleared for the next run by heating for several minutes at 180°C.

The following gas chromatographic conditions are employed for rapid elution of residual hexane from oils and resolution of the hexane from other volatiles: Instrument:Micro-Tex 2000 MF with dual independent hydrogen flame detectors. Recorder. Westronic LD 11 B. Integrator: Infotronics CRS-100. Columns: ¼ in. o.d. stainless steel U-tubes, 2 feet long packed with Porapak P (80–100 mesh highly crosslinked polystyrene bead manufactured by Waters Associates for use in gas chromatographic packing material). Carrier gas: helium. Flow rates: helium, 60 ml/min each column; hydrogen, 52 ml/min to each flame: air, 1.2 cu ft/hr (fuel and scavenger gas for both flames). Temperature: detector at 200°C; injector port at 110°C; columns programmed at 5°C/min for 22 min; final hold at 180°C for 10 min. Attenuation: 10 ×1, Auto X 1 for integrator. Chart speed: 30 in/hr.

A calibration chart for use with a 25-milligram sample of oil is prepared as follows. Ten milligrams of hexane is added to 20 grams of hexane-free oil to yield a concentration of hexane of 500 ppm. Aliquots (1 mg, 2.5 mg, 5 mg, 10 mg, 25 mg, 50 mg, 100 mg and 250 mg) of this oil are analyzed for hexane by this rapid elution procedure. For construction of the calibration curve, the milligrams of oil are then multiplied by 20 to convert them into terms (ppm) applicable to analysis of a 25-milligram sample, and these values are plotted against the peak area counts.

The results of representative analyses of vegetable oils for residual hexane by this rapid elution procedure are shown in Table I.

Example 2

Analysis of Nut-Butter Products for Volatile Components

A 1 to 3 gram sample of peanut butter is placed in a 2 dram serum bottle containing 1 gram of distilled water and several glass beads. The bottle is sealed with a syringe penetratable rubber septum and aluminum retainer ring. This operation is carried out in a glove bag filled with nitrogen. By preweighing all the components of the bottle, the exact quantity of peanut butter added is calculated by weighing the sealed bottle. By means of an injection syringe, distilled water is added to bring the ratio of water to peanut butter to 1.5 to 1. The sample is then shaken until a smooth liquid slurry of peanut butter and water is formed. A glass inlet liner containing glass wool is placed on top of the silicone 0 ring in the inlet of the gas chromatograph. The inlet retainer nut is tightened firmly to form a seal between the base of the inlet liner and the inlet, thus forcing the carrier gas to flow through the liner. A 500 $\mu$ syringe fitted with a 2-inch long 18-gauge needle is filled to 50 $\mu$ with distilled water and then the needle is inserted into the serum bottle to withdrawn 300 $\mu$ of liquid slurry sample into the syringe. The 50 $\mu$ of distilled water layered above the sample in the syringe provides for complete injection of the entire sample on to the glass wool in the liner of the gas chromatograph. After the sample is injected on to the glass wool in the inlet of the chromatograph, a 20-minute hold period is allowed during which the column oven is kept at a temperature of 50°C. The carrier gas thus sweeps the sample volatiles on to the chromatographic column. The inlet liner containing the spent sample then is removed from the inlet and the inlet is immediately resealed. The following gas chromatographic conditions are used to readily resolve the voltatile components absorbed on the column: Instrument, recorder and integrator are the same as described in Example 1. Columns: 6 ft ×⅛ in. o.d. U-tubes packed with 80–100 mesh Porapak P. Carrier gas: helium. Flow rates: helium 70 ml/min for each column; hydrogen 60 ml/min to each flame; air 1.2 cu. ft/hr (fuel and scavenger gas for both flames). Temperature: detector at 250°C; inlet at 155°C; column oven programmed 50 to 220°C; initial hold at 50°C for 5 min after the spent sample is removed from the inlet; programmed at 10°C/min for 8 min, 2°C/min for 10 min, 15°C/min for 2 min; final hold at 180°C for 10 min and then raised manually to 220°C for 10 min or longer to clean the column. Electrometer attenuation: 10 ×1.

By this method of analysis, many voltaile compounds are eluted from a typical peanut butter sample. Some of these compounds such as isobutyraldehyde, isovaleraldehyde, pentanal, pyrazines, hexanal and phenylacetaldehyde, appear to be related to the overall flavor and aroma characteristics of the peanut butter sample. Of these, we have found isovaleraldehyde and hexanal to be quite meaningful in terms of objectively classifying the odor and flavor characteristics of peanut butter. When a ratio is computed for the gas chromatographic peak areas of isovaleraldehyde and hexanal obtained by this rapid elution procedure, it is possible to relate the values obtained directly to the flavor scores determined subjectively by taste panel procedures.

Example 3

Analysis of Oilseed Meals and Flours for Residual Solvents Hexane

A medium-size plug of volatile-free glass wool is inserted at the bottom of the glass liner of the injection port of a gas chromatograph. The glass wool is tamped down lightly, and 0.04 gram of oilseed meal or flour is added on top. The sample is capped with another plug of glass wool. The liner with the sample is inserted on top of the silicone 0 ring in the inlet of the gas chromatograph, and the inlet retainer nut is tightened firmly to form a seal between the base of the inlet liner and the inlet, thus forcing the carrier gas to flow through the liner. After the septum is placed in position, 80 $\mu$ of water is immediately injected above the sample with a 100 $\mu$ equipped with a 2-inch needle. The digital integrator and the temperature programmed are turned on. After the hexane peak has been completely eluted, the spent sample is removed from the inlet and 20 $\mu$ of water is injected to clean the column. The following gas chromatographic conditions are employed for rapid elution and resolution of the hexane peak. Instrument, recorder and integrator are the same as described under analysis of vegetable oils for residual hexane. Columns: 2 ft ×¼ in. o.d. stainless steel U-tubes packed with 80–100 mesh Porapak P. Carrier gas: helium. Flow rates: Helium 70 ml/min for each column; hydrogen, 60 ml/min to each flame; air 1.2 cu. ft/hr (fuel and scavenger gas for both flames). Temperature: detector at 200°C; inlet at 105°C; columns programmed between 70 and 180°C; initial hold at 70°C for 6 min; programmed at 10°C/min for 11 min final hold at 180°C for 4 min. Attenuation: 10 ×2 for both electrometers, auto X 1 for integrator. Chart speed: 30 in/hr.

A calibration curve for use with a 0.04 gram sample of oilseed meal or flour is prepared as follows. Equal amounts of hexane (7.3 $\mu$, 4.8 mg) are injected into three empty 120 ml serum bottles which are sealed with neoprene septums and aluminum retainer rings. Thus, each $\mu$ of gas in the bottles contain 0.04 $\mu$ of hexane which corresponds to 1 ppm of hexane for a 0.04 gram sample of meal or flour. A 0.04 gram sample of hexane-free cottonseed flour is placed between two small glass wool plugs in an inlet liner. The liner with the sample is inserted into the heated inlet and properly secured. An aliquot of the gas from a serum bottle is withdrawn and injected above the sample of flour and followed by injection of 80 $\mu$ of water. The integrator and temperature programmer are turned on to complete the chromatographic cycle. Several aliquots of headspace gas from each of the bottles is analyzed by this procedure as follows. Aliquots of 10, 400, 1,500, and 2,200 $\mu$ from bottle 1; 80, 880, 1,400, and 2,000 $\mu$ from bottle 2; and 200, 600, 1,200 and 2,500 $\mu$ from bottle 3. Since each $\mu$ of headspace gas corresponds to 1 ppm of hexane for a 0.04 gram sample of meal or flour, the calibration curve is constructed by plotting the integrator counts (peak area) against $\mu$ of headspace gas (ppm).

The results of analyses of various meals and flours for residual hexane comparing the more time-consuming volatilization procedure and the rapid elution procedure are shown in Table II.

Example 4

Acetone and Isopropyl Alcohol

A medium-size plug of voltatile-free glass wool is inserted at the bottom of the glass liner of the injection port of a gas chromatograph. The glass wool is tamped down lightly, and 0.05 gram of oilseed meal or flour is added on top. The sample is covered with an additional amount of glass wool and 250 $\mu$ of water is added on top of the glass wool plug and allowed to moisten the oilseed meal or flour for about 5 min. Then the liner is inserted in the heated injection port and tightened in position with the inlet retainer nut. The injection port is sealed immediately with the septum and septum nut. The digital integrator and the temperature programmer are turned on.

The flow of the carrier gas through the sample and heat from the injection port results in rapid elution of the residual acetone or isopropyl alcohol from the sample. After the chromatographic run is completed, the spent sample is removed from the inlet. The column is cleaned for the next run by heating for 20 min at 190°C.

The following gas chromatographic conditions are employed for rapid elution of residual acetone or isopropyl alcohol from oilseed meal and flours. Instrument, recorder and integrator are the same as described under analysis of vegetable oils for residual hexane. Columns: ¼ in. o.d. stainless steel U-tubes 1 ft long packed with Porapak Q (80–100 mesh). Carrier gas: helium. Flow rates: helium, 60 ml/min each column; hydrogen, 52 ml/min to each flame; air 1.2 cu ft/hr (fuel and scavenger gas for both flames). Temperature: detector at 200°C; injector port at 95°C; columns programmed between 60 and 190°C; initial hold at 60°C for 5 min; programmed at 5°C/min for 26 min; final hold at 190°C for 20 min. Attenuation: 10 ×1 and Auto X 1 for integrator. Chart speed 30 in/hr.

A calibration chart for use with a 0.05 gram sample of oilseed meal or flour is prepared as follows. Ten mg of acetone or isopropyl alcohol is added to 20 grams of water to yield a concentration of acetone or isopropyl alcohol of 500 parts per million (ppm). One gram of each solution is diluted with 9 grams of water to yield a concentration of acetone or isopropyl alcohol of 50 ppm. Aliquots (25 $\mu$, 50 $\mu$ and 100 $\mu$) of each of these four solutions are analyzed by gas chromatography, and the appropriate values are plotted against peak area counts.

The results of analyses of various meals and flours for acetone and isopropyl alcohol which compare the more time-consuming volatilization procedure and the rapid elution procedures are shown in Table III and IV.

Example 5

Mesityl Oxide and Diacetone Alcohol

A medium-size plug of voltatile-free glass wool is inserted at the bottom of the glass liner of the injection port of a gas chromatograph. The glass wool is tamped down lightly, and 0.04 gram of oilseed meal or flour is added on top. The sample is capped with another plug of glass wool. 1.1 gram of water-saturated Molecular Sieve Pellets 5A (alkali metal aluminosilicates distributed by TekLab 1818 Wooddale Blvd., Baton Rounge, La. 70806) is added above the top layer of glass wool. The liner is then inserted in the heated injection port of the gas chromatograph and tightened in position with the inlet retainer nut. The injection port is sealed immediately with the septum and septum nut. The digital integrator and the temperature programmer are turned on. Heat from the injection port causes the release of 350 $\mu$ of water from the molecular sieve present and in conjunction with the flow of the carrier gas through the sample, results in rapid elution of the residual mesityl oxide or diacetone alcohol present. After the chromatographic run is completed, the spent sample is removed from the inlet. The column is cleaned for the next run by injecting 20 $\mu$ of water on the column and heating at 200° for 10 min. The following gas-chromatographic conditions are employed for rapid elution of mesityl oxide or diacetone alcohol from oilseed meal or flours: Instrument, recorder and integrator are the same as described under analysis of vegetable oils for residual hexane. Columns: 2 ft ×¼ in. o.d. stainless steel U-tubes packed with 80–100 mesh Porapak P. Carrier gas: helium. Flow rates: helium 70 ml/min for each column; hydrogen, 60 ml/min to each flame; air 1.2 cu ft/hr (fuel and scavenger gas for both flames). Temperature: detector at 225°C; inlet at 150°C; columns programmed between 100° and 200°C; initial hold 100°C for 7 min; programmed at 5°C/min for 10 min, then 0.5°C/min for 4 min, then at 15°C/min for 3 min and final hold at 200°C for 4 min. Attenuation: 10 ×1 for both electrometers, auto X 1 for integrator. Chart speed: 30 in/hr.

A calibration chart for use with a 0.04 gram of oilseed meal or flour is prepared as follows. A small plug of glass wool is placed in the liner in the inlet of the gas chromatograph. 200 $\mu$ of water containing a known amount of mesityl oxide or diacetone alcohol (corresponding to parts per million for a 0.04 gram meal sample) is injected onto the glass wool plug and the chromatographic procedure described above is carried out. This is repeated for appropriate values ranging from 3 to 300 ppm. The ppm values used in each case is then plotted against peak area count obtained to produce the calibration chart.

The results of analyses of cottonseed flour for mesityl oxide and diacetone alcohol by the more involved and time-consuming distillation procedure and the rapid elution procedure is shown in Table V.

TABLE I

Determination of Residual Hexane by Rapid Elution Procedure

| Type of Sample | Hexane recovered (ppm) | |
|---|---|---|
| | Cottonseed oil | Soybean oil |
| Deodorized | ND[a] | ND |
| Deodorized | ND | ND |
| Deodorized | ND | ND |
| Refined | 5 | 10 |
| Refined | 50 | 150 |
| Refined | 80 | 170 |
| Crude | 200 | 250 |
| Crude | 450 | 550 |
| Crude | 950 | 1000 |
| Crude | 1500 | 1600 |
| Crude | 5000 | 3500 |

[a]None detectable

TABLE II

Determination of Residual Hexane by Volatilization and Rapid Elution Procedures

| Type of Sample[a] | Hexane Recovered (ppm) | |
|---|---|---|
| | Volatilization | Direct GLC |
| Cottonseed flour | 11 | 12 |
| Cottonseed flour | 30 | 33 |
| Cottonseed meal | 11 | 12 |
| Cottonseed meal | 135 | 130 |

| | | |
|---|---|---|
| Cottonseed meal | 920 | 920 |
| Cottonseed meal | 2300 | 2600 |
| Peanut meal | 17 | 20 |
| Peanut meal | ND[b] | ND |
| Cottonseed meal | ND | ND |
| Soybean flour | 13 | 15 |
| Soybean flour | 75 | 75 |
| Soybean flour | 125 | 125 |
| Fish flour | 15 | 20 |
| Fish flour | 390 | 420 |

[a] The first eight samples were prepared in the laboratory or pilot plant; the other four were commercial.
[b] None detectable.

[a] None detectable

TABLE III

Determination of Residual Acetone by Volatilization and Rapid Elution Procedures

| Type of Sample | Acetone recovered (ppm) | |
|---|---|---|
| | Volatilization | Rapid elution |
| Cottonseed meal | 6 | 6 |
| Cottonseed meal | 15 | 10 |
| Cottonseed meal | 20 | 20 |
| Cottonseed meal | 130 | 120 |
| Cottonseed meal | 550 | 510 |
| Cottonseed meal | 1600 | 1550 |
| Cottonseed flour | 25 | 25 |
| Cottonseed flour | 45 | 45 |
| Cottonseed flour | 200 | 200 |
| Soybean meal | 5 | 5 |
| Soybean meal | 6 | 8 |

TABLE IV

Determination of Residual Isopropanol by Volatilization and Rapid Elution Procedures

| Type of sample | Isopropanol recovered (ppm) | |
|---|---|---|
| | Volatilization | Rapid elution |
| Cottonseed meal | 10 | 10 |
| Cottonseed meal | 15 | 15 |
| Cottonseed meal | 25 | 25 |
| Cottonseed meal | 210 | 230 |
| Cottonseed meal | 750 | 780 |
| Cottonseed meal | 1650 | 1600 |
| Soybean meal | ND[a] | ND |
| Soybean meal | ND | ND |

TABLE V

Determination of Residual Mesityl Oxide and Diacetone Alcohol in Cottonseed Flours by Distillation and Rapid Elution Procedures

| Mesityl Oxide Recovered (ppm) | | Diacetone Alcohol Recovered (ppm) | |
|---|---|---|---|
| Distillation | Rapid Elution | Distillation | Rapid Elution |
| 300 | 220 | 58 | 72 |
| 120 | 85 | 56 | 60 |
| 15 | 20 | tr[a] | 11 |
| 9 | 8 | 200 | 190 |
| 4 | 4 | ND[b] | ND |
| 2 | 3 | ND | ND |
| ND | 5 | ND | ND |

[a] Trace
[b] None Detected

We claim:

1. A process for quantitatively determining residual solvents and acetone dimers in meals and flours which process comprises:
   a. inserting one part of a sample of meal or flour between two plugs of glass wool in a glass liner,
   b. adding 1 to 5 parts of water to the sample from a,
   c. inserting the liner with sample into the heated injection port of a gas chromatograph to force the carrier gas through the sample, accelerating the elution of the solvent,
   d. analyzing the solvent from c by temperature programmed gas chromatography.

* * * * *